(12) United States Patent
Lacroix et al.

(10) Patent No.: US 11,390,789 B2
(45) Date of Patent: *Jul. 19, 2022

(54) COOLING AND FLAME-RETARDANT COMPOSITION FOR A PROPULSION SYSTEM OF AN ELECTRIC OR HYBRID VEHICLE

(71) Applicant: TOTAL MARKETING SERVICES, Puteaux (FR)

(72) Inventors: Eric Lacroix, Amberieux d'Azergues (FR); Philippe China, Seyssuel (FR); Francis Rondelez, Fontenay-aux-Roses (FR)

(73) Assignee: Total Marketing Services, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/259,287

(22) PCT Filed: Jul. 10, 2019

(86) PCT No.: PCT/EP2019/068616
§ 371 (c)(1),
(2) Date: Jan. 11, 2021

(87) PCT Pub. No.: WO2020/011888
PCT Pub. Date: Jan. 16, 2020

(65) Prior Publication Data
US 2021/0253928 A1    Aug. 19, 2021

(30) Foreign Application Priority Data

Jul. 13, 2018  (FR) ..................................... 1856474

(51) Int. Cl.
C09K 5/20      (2006.01)
H01M 10/613   (2014.01)
(Continued)

(52) U.S. Cl.
CPC ................ C09K 5/20 (2013.01); C09K 21/08 (2013.01); C10M 107/02 (2013.01);
(Continued)

(58) Field of Classification Search
CPC ... C09K 21/08; C10M 107/02; C10M 107/34; C10M 131/04; C10M 131/10;
(Continued)

(56) References Cited

U.S. PATENT DOCUMENTS 5,839,311 A * 11/1998 Grenfell ............... C10M 105/54
                                                              72/42
5,851,436 A * 12/1998 Merchant ............... C11D 7/261
                                                             252/364

(Continued)

FOREIGN PATENT DOCUMENTS

CN   105969315 A   9/2016
CN   108199113 A   8/2018
(Continued)

OTHER PUBLICATIONS

Isopar, ExxonMobil, "Isopar (TM) Fluids for Personal Care Products", XP055560761, https://www.exxonmobilchemical.com/~/media/chemicals/kl-media-assets/2018/02/09/00/01/isopar_fluids_factsheets_enpdf.pdf [extrait le Feb. 22, 2019], Jan. 31, 2018, 2 pages.

(Continued)

*Primary Examiner* — Ellen M McAvoy
(74) *Attorney, Agent, or Firm* — The Marbury Law Group, PLLC

(57) ABSTRACT

The present invention relates to a composition for cooling a propulsion system of an electric or hybrid vehicle including at least one battery, comprising: (i) at least one base oil or at least one hydrocarbon-based fluid with a boiling point of greater than or equal to 50° C.; (ii) at least one fire retardant corresponding to formula (I)

$$R_F\text{-}L\text{-}R_H \qquad (I)$$

(Continued)

in which $R_F$ is a perfluorinated or partially fluorinated group, $R_H$ is a hydrocarbon-based group, and L is a linker; and (iii) at least one fluoro compound with a boiling point of between 50 and 250° C.

The invention also relates to the use of at least one fluoro compound with a boiling point of between 50° C. and 250° C. for promoting the contact between a fire retardant corresponding to formula (I) and an element of a propulsion system of an electric or hybrid vehicle, when thermal runaway is observed, said fire retardant of formula (I) being formulated in a base oil, or a hydrocarbon-based fluid with a boiling point of greater than or equal to 50° C.

Finally, the invention relates to a process for cooling and fire-protecting at least one battery of a propulsion system of an electric or hybrid vehicle, comprising at least one step of placing at least one battery in contact with a composition according to the invention.

20 Claims, 1 Drawing Sheet

(51) Int. Cl.
| | |
|---|---|
| H01M 10/625 | (2014.01) |
| H01M 10/6567 | (2014.01) |
| C09K 21/08 | (2006.01) |
| C10M 107/02 | (2006.01) |
| C10M 107/34 | (2006.01) |
| C10M 131/04 | (2006.01) |
| C10M 131/10 | (2006.01) |
| C10M 135/22 | (2006.01) |
| C10M 137/04 | (2006.01) |
| C10M 169/04 | (2006.01) |
| C10N 30/02 | (2006.01) |
| C10N 30/08 | (2006.01) |
| C10N 40/16 | (2006.01) |

(52) U.S. Cl.
CPC ........ *C10M 107/34* (2013.01); *C10M 131/04* (2013.01); *C10M 131/10* (2013.01); *C10M 135/22* (2013.01); *C10M 137/04* (2013.01); *C10M 169/04* (2013.01); *H01M 10/613* (2015.04); *H01M 10/625* (2015.04); *H01M 10/6567* (2015.04); *C10M 2205/0206* (2013.01); *C10M 2209/1033* (2013.01); *C10M 2211/022* (2013.01); *C10M 2211/042* (2013.01); *C10M 2219/082* (2013.01); *C10M 2223/04* (2013.01); *C10N 2030/02* (2013.01); *C10N 2030/08* (2013.01); *C10N 2040/16* (2013.01); *H01M 2200/00* (2013.01); *H01M 2220/20* (2013.01)

(58) Field of Classification Search
CPC .......................... C10M 135/22; C10M 137/04; C10M 169/04; C10M 2205/0206; C10M 2209/1033; C10M 2211/022; H01M 10/613; H01M 10/625; H01M 10/6567
See application file for complete search history.

(56) References Cited

U.S. PATENT DOCUMENTS

| | | | |
|---|---|---|---|
| 6,417,153 B1 | 7/2002 | Owens | |
| 2002/0147117 A1 | 10/2002 | Kawata et al. | |
| 2011/0275549 A1 | 11/2011 | Nonaka et al. | |
| 2012/0157362 A1 | 6/2012 | Knapp et al. | |
| 2012/0164506 A1* | 6/2012 | Claeys | C09K 5/10 429/120 |
| 2012/0283162 A1 | 11/2012 | Tsubouchi | |
| 2013/0012421 A1* | 1/2013 | Smith | C10M 171/02 508/578 |
| 2015/0377533 A1 | 12/2015 | Harkins | |
| 2016/0248061 A1 | 8/2016 | Brambrink et al. | |
| 2016/0257886 A1 | 9/2016 | Gangi | |
| 2016/0376209 A1* | 12/2016 | Gregersen | A62C 99/0018 169/30 |
| 2018/0079990 A1 | 3/2018 | Aoyama | |
| 2018/0100115 A1 | 4/2018 | Gao et al. | |
| 2018/0100117 A1* | 4/2018 | Flores-Torres | C10M 167/00 |
| 2018/0100118 A1* | 4/2018 | Flores-Torres | C10M 169/04 |
| 2018/0100120 A1* | 4/2018 | Flores-Torres | C10M 101/02 |
| 2019/0024006 A1* | 1/2019 | Yoshida | C10M 147/04 |
| 2019/0264121 A1* | 8/2019 | China | C10M 101/02 |
| 2020/0248095 A1* | 8/2020 | Guerin | C10M 119/12 |
| 2021/0139805 A1* | 5/2021 | Champagne | H01M 10/30 |
| 2021/0292628 A1* | 9/2021 | Prentice | H01M 10/613 |

FOREIGN PATENT DOCUMENTS

| | | | |
|---|---|---|---|
| EP | 1 728 844 | A1 | 6/2006 |
| EP | 2 084 245 | A1 | 8/2009 |
| EP | 2 368 967 | A1 | 9/2011 |
| EP | 3144059 | A1 | 3/2017 |
| JP | 2012-184360 | A | 9/2012 |
| WO | 97/21425 | A1 | 6/1997 |
| WO | 97/47704 | A1 | 12/1997 |
| WO | 02/08378 | A1 | 1/2002 |
| WO | 2008/149325 | A1 | 12/2008 |
| WO | 2011/011385 | A1 | 9/2011 |
| WO | 2011/113851 | A1 | 9/2011 |
| WO | 2014/033762 | A1 | 9/2012 |
| WO | 2015/116496 | A1 | 8/2015 |
| WO | 2016/185046 | A1 | 11/2016 |
| WO | 2018/078024 | A1 | 5/2018 |

OTHER PUBLICATIONS

Thompson Scientific, London, GB; vol. 2012, No. 67, AN 2012-M44304, Retrieved from: Database WPI, XP002789196, 2017 Clarivate Analytics.

English language translation of International Search Report for International Application No. PCT/EP2019/068614 received from the European Patent Office dated Oct. 4, 2019.

Written Opinion for International Application No. PCT/EP2019/068614 received from the European Patent Office dated Jul. 10, 2019.

English language translation of International Search Report for International Application No. PCT/EP2019/068613 received from the European Patent Office dated Oct. 2, 2019.

Written Opinion for International Application No. PCT/EP2019/068613 received from the European Patent Office dated Jul. 10, 2019.

English language translation of International Search Report for International Application No. PCT/EP2019/068616 received from the European Patent Office dated Oct. 4, 2019.

Written Opinion for International Application No. PCT/EP2019/068616 received from the European Patent Office dated Jul. 10, 2019.

English language translation of International Search Report for International Application No. PCT/EP2019/068617 received from the European Patent Office dated Oct. 7, 2019.

Written Opinion for International Application No. PCT/EP2019/068617 received from the European Patent Office dated Jul. 10, 2019.

Non-Final Office Action for copending U.S. Appl. No. 17/259,278, dated Sep. 16, 2021.

Non-Final Office Action for copending U.S. Appl. No. 17/259,280, dated Sep. 16, 2021.

Non-Final Office Action for copending U.S. Appl. No. 17/259,285, dated Nov. 22, 2021.

Non-Final Office Action for copending U.S. Appl. No. 17/259,278, dated Mar. 1, 2022.

(56) References Cited

OTHER PUBLICATIONS

Translation of Chinese Office Action for counterpart Application No. 201980056085.6, dated Nov. 3, 2021.
Final Office Action for copending U.S. Appl. No. 17/259,285, dated May 18, 2022.

* cited by examiner

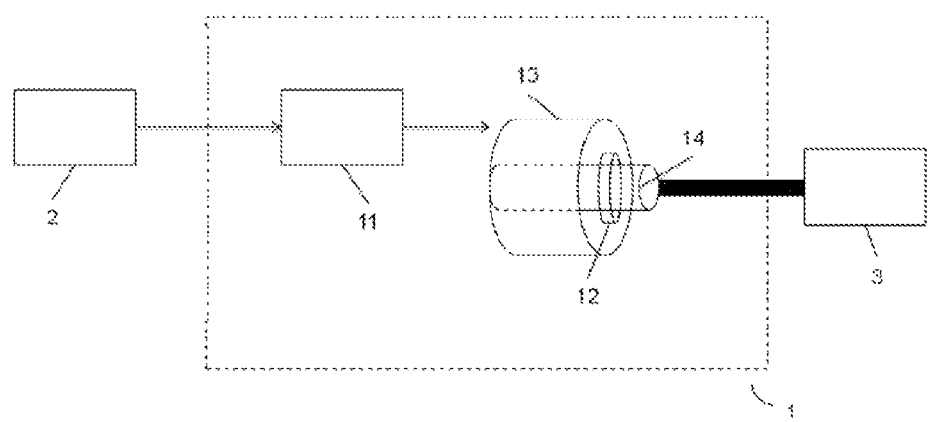

COOLING AND FLAME-RETARDANT COMPOSITION FOR A PROPULSION SYSTEM OF AN ELECTRIC OR HYBRID VEHICLE

CROSS REFERENCE TO RELATED APPLICATIONS

This application in a National Phase Application claiming priority to International Application No. PCT/EP2019/068616 filed Jul. 10, 2019, which claims priority to French Application No. 1856474, filed Jul. 13, 2018, both of which are incorporated by reference herein in their entirety.

The present invention relates to the field of propulsion systems for electric or hybrid vehicles, and more particularly to the means for lubricating and/or cooling them. The invention is thus directed toward proposing a composition which at least has cooling properties on the power electronics and the battery, and optionally lubricant properties with respect to the transmission of the propulsion system, and the two properties combined with respect to the motor in a propulsion system of an electric or hybrid vehicle. The composition also has ignition-resistance properties, which displays its utility with respect to batteries. In other words, the present invention is directed in particular toward proposing a means for cooling the batteries of electric or hybrid vehicles via a fluid which can cool but also retard or prevent fire propagation.

The changes in the international standards for the reduction of $CO_2$ emissions, but also for the reduction of energy consumption, has driven motor vehicle constructors toward proposing alternative solutions to combustion engines.

One of the solutions identified by motor vehicle constructors consists in replacing combustion engines with electric motors. The research aimed at reducing $CO_2$ emissions has thus led to the development of electric vehicles by a certain number of motor vehicle companies.

For the purposes of the present invention, the term "electric vehicle" means a vehicle comprising an electric motor as sole means of propulsion, as opposed to a hybrid vehicle which comprises a combustion engine and an electric motor as combined means of propulsion.

For the purposes of the present invention, the term "propulsion system" means a system comprising the mechanical parts required for propelling an electric vehicle. The propulsion system thus more particularly encompasses an electric motor comprising the rotor-stator assembly, power electronics (dedicated to regulating the speed), a transmission and a battery.

In general, it is necessary to use, in electric or hybrid vehicles, compositions to meet the constraints of lubricating and/or cooling the various parts of the propulsion system recalled above.

Depending on the system, the same composition may act as lubricant and as coolant whereas, in other systems, there may be both a lubricant composition dedicated to this action on the elements of the propulsion system, as has just been described, and a different cooling composition, in particular for the batteries and the power electronics.

This second alternative is notably used when hydrocarbon-based fluids with a boiling point of greater than or equal to 50° C., notably between 50 and 350° C., in particular between 60 and 200° C., and even more particularly between 80 and 150° C., are used for cooling the batteries and the power electronics, as will be detailed hereinbelow. Such hydrocarbon-based fluids do not have any lubricant properties.

A cooling, and optionally lubricant, composition according to the invention ensures the safety of batteries, while at the same time cooling the battery.

According to a particular embodiment, the composition according to the invention acts both as coolant and as lubricant.

Still according to this embodiment, as regards the electric motor itself, the composition acts both as lubricant and as coolant. As regards the power electronics, the composition acts as coolant. The transmission is lubricated with the composition and, finally, the batteries are cooled with said composition.

Lubricant compositions, also referred to as "lubricants", are commonly used in propulsion systems such as electric motors for the purposes of reducing the friction forces between the various metal parts in motion in the motors. They are also effective for preventing premature wear or even damage of these parts, and in particular of their surface.

To do this, a lubricant composition is conventionally composed of one or more base oils which are generally combined with several additives intended for stimulating the lubricant performance of the base oils, for instance friction-modifying additives.

Moreover, electric propulsion systems generate heat during their functioning via the electric motor, the power electronics and the batteries. Since the amount of heat generated is greater than the amount of heat normally dissipated to the environment, it is necessary to ensure cooling of the motor, the power electronics and the batteries. In general, the cooling takes place on several parts of the propulsion system which generate heat and/or the heat-sensitive parts of said system, so as to prevent dangerous temperatures from being reached, and notably the power electronics and the batteries.

Conventionally, it is known practice to cool electric motors with air or water, optionally combined with glycol. These cooling methods are not optimal, or even are insufficient with regard to the new evolutions of electric and hybrid vehicle propulsion systems.

Fire retardants that can be used in fluids, including oily fluids, notably for industrial applications, are moreover known.

However, certain virtually nonflammable oils are generally composed of heavy halogenated compounds such as polychlorotrifluoroethylenes (PCTFE). Moreover, certain perfluorinated organic fluids of ether or ketone type are also known as coolant fluids for the propulsion system of electric vehicles.

These halogenated compounds are very expensive and their use is not favored for regulatory and environmental reasons. Furthermore, these halogenated compounds have a high density which adds to the mass of the battery, the final consequence of which would be to reduce the autonomy of the vehicle.

Despite the cooling systems known in the field of lubrication of the propulsion systems of electric or hybrid vehicles, the risk of overheating in a cell of the battery cannot be entirely eliminated, and may lead to an explosion and to the whole battery igniting, which is known as the "runaway effect". This is in particular what may be feared in the functioning of an Li-ion battery which is particularly targeted in the context of the present invention.

The present invention is directed precisely toward proposing a novel composition for satisfying at least the cooling of the abovementioned elements of the propulsion system, on the one hand, and also, on the other hand, for ensuring the safety of batteries, in particular lithium-ion (Li-ion) or nickel-cadmium (Ni—Cd) batteries, by imparting ignition-resistance properties.

More precisely, the inventors have discovered that it is possible to ensure at least the cooling function and also the ignition-resistance function for a propulsion system of an electric or hybrid vehicle, by using at least one fire retardant of formula (I) as defined below in combination with at least one fluoro compound having a boiling point of between 50 and 250° C., preferably between 55° C. and 120° C., in a cooling composition including at least one hydrocarbon-based fluid with a boiling point of at least 50° C.

The composition thus formed may be placed in direct contact with the propulsion system and cool the motor, the power electronics and the battery by means of this direct contact of said composition with these members, while at the same time ensuring increased safety in the event of runaway of said battery.

The composition thus in direct contact with these members provides better cooling than conventional air cooling and water cooling with indirect contact. This direct contact allows better heat dissipation.

The reason for this is that air cooling allows direct cooling, but air is a very poor heat-dissipating fluid. Conversely, water is an efficient coolant fluid but is incompatible with direct contact with the motor, the power electronics and the battery.

Thus, according to a first of its aspects, the subject of the present invention is a composition for cooling a propulsion system of an electric or hybrid vehicle including at least one battery, comprising:
(i) at least one base oil, or at least one hydrocarbon-based fluid with a boiling point of greater than or equal to 50° C.;
(ii) at least one fire retardant corresponding to formula (I)

$$R_F\text{-L-}R_H \quad (I)$$

in which
$R_F$ is a perfluorinated or partially fluorinated group, in particular including from 1 to 22, preferably from 1 to 20 and even more preferentially from 1 to 16 carbon atoms,
$R_H$ is a hydrocarbon-based group, in particular including from 1 to 22, preferably from 1 to 20 and even more preferentially from 1 to 16 carbon atoms, and
L is a linker; and
(iii) at least one fluoro compound with a boiling point of between 50° C. and 250° C.

A subject of the present invention is also the use of at least one fluoro compound with a boiling point of between 50° C. and 250° C. for promoting the contact between a fire retardant corresponding to formula (I) as defined previously and an element of a propulsion system of an electric or hybrid vehicle, in particular a battery or the power electronics, and more particularly a battery, when thermal runaway is observed, in particular as soon as the temperature reaches 50° C., notably 55° C., said fire retardant of formula (I) being formulated in a base oil, or a hydrocarbon-based fluid with a boiling point of greater than or equal to 50° C.

The composition thus obtained advantageously includes micelles formed by the fire retardant of formula (I) as defined above, containing the fluoro compound with a boiling point of between 50 and 250° C., preferably between 55° C. and 120° C., the purpose of said compound being to cause rupture of said micelles and to enable the fire retardant of formula (I) as defined below to fully exert its flame-retardant function as soon as an element of the propulsion system becomes overheated, and more precisely when at least one battery becomes overheated.

Thus, in the event of a strong temperature increase, the fluoro compound with a boiling point of between 50 and 250° C., preferably between 55° C. and 120° C., behaves like an initiator of the at least partial rupture of the micelles formed in the presence of the fire retardant of formula (I) as defined below. In other words, the purpose of the fluoro compound is to promote the contact between the fire retardant of formula (I) and the battery requiring cooling, in particular rapid cooling, in the event of runaway thereof.

Specifically, in the absence of such a fluoro compound with a boiling point of between 50 and 250° C., the micelles remain in micelle form and the action of the fluoro component, or group $R_F$, of the fire retardant of formula (I) as defined below has the drawback of not being fully exerted owing to a lack of optimum contact between said fluoro component and the overheating battery. Specifically, when the micelles remain intact, said fluoro component remains in the core of the micelles, limiting the direct contact with the battery. Alternatively, the amount of said fire retardant of formula (I) as defined below would have to be greatly increased, which is not desired.

In other words, to prevent this risk of the micelles of the composition circulating around the various elements of the propulsion system, which are inoperative or at the very least partially inoperative in the event of overheating or runaway of the batteries, the presence of a fluoro compound with a boiling point of between 50 and 250° C. allows access of the fire retardant of formula (I) as defined below to the surface of the composition and, as a result, increased contact of the fluoro component or group $R_F$ of the fire retardant of formula (I) with the element of the propulsion system to be fire-protected, in particular the battery.

More particularly, the lubricant composition thus supplemented is intended to be placed in direct contact with the batteries of electric vehicles, notably Li-ion or Ni—Cd batteries, which are notably in immersion or semi-immersion, static or in circulation, in said supplemented lubricant composition, or composition according to the invention, or else directly sprayed in the form of an oil spray, jet or mist.

The invention also relates to a process for cooling and fire-protecting a battery of a propulsion system of an electric or hybrid vehicle, comprising at least one step of placing at least one battery, in particular a lithium-ion or nickel-cadmium battery, in contact with a composition according to the invention.

Other features, variants and advantages of the use of a composition according to the invention will emerge more clearly on reading the description and the FIGURE that follow, which are given as nonlimiting illustrations of the invention.

In the context of the present invention, the terms "flame retardant", capable of "providing fire protection", "fire retardant", "retarding and/or preventing fire propagation" or "ignition-resistant" may be used interchangeably. All these terms qualify the compounds which have the capacity of rendering an object safe in the event of an explosion or an ignition, in particular following overheating.

In the continuation of the text, the expressions "between . . . and . . . ", "ranging from . . . to . . . " and "varying from . . . to . . . " are equivalent and are intended to mean that the limits are included, unless otherwise mentioned.

The expression "including a" should be understood as being synonymous with "including at least one", unless otherwise specified.

FIG. 1 is a schematic representation of an electric or hybrid propulsion system.

COMPOSITION

As indicated previously, a composition according to the invention comprises at least one base oil, or at least one hydrocarbon-based fluid with a boiling point of greater than or equal to 50° C.

More particularly, a composition according to the invention has a kinematic viscosity, measured at 100° C. according to the standard ASTM D445, of between 2 and 8 mm²/s, preferably between 3 and 7 mm²/s.

Base Oil

A composition according to the invention uses at least one base oil, in particular a fluid base formed from one or more base oils, having a kinematic viscosity, measured at 100° C. according to the standard ASTM D445, ranging from 1.5 to 8 mm²/s, in particular from 1.5 to 6.1 mm²/s, more particularly from 1.5 to 4.1 mm²/s and even more particularly from 1.5 to 2.1 mm²/s.

This base oil may be a mixture of several base oils, namely a mixture of two, three or four base oils.

In the continuation of the text, the term "fluid base" will denote the base oil or mixture of base oils, having a kinematic viscosity measured at 100° C. according to the standard ASTM D445 ranging from 1.5 to 8 mm²/s.

The base oil used in a cooling composition according to the invention may be chosen from oils of mineral or synthetic origin belonging to groups I to V according to the classes defined by the API classification (or equivalents thereof according to the ATIEL classification) and presented in table A below or mixtures thereof, provided that the oil or the mixture of oils has the abovementioned desired viscosity.

TABLE A

| | Content of saturates | Sulfur content | Viscosity index (VI) |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydroisomerized oils | ≥90% | ≤0.03% | ≥120 |
| Group IV | Poly-α-olefins (PAO) | | |
| Group V | Esters and other bases not included in groups I to IV | | |

The mineral base oils include all types of base oils obtained by atmospheric and vacuum distillation of crude oil, followed by refining operations such as solvent extraction, deasphalting, solvent deparaffinning, hydrotreating, hydrocracking, hydroisomerization and hydrofinishing.

Mixtures of synthetic and mineral oils, which may be biobased, may also be used.

There is generally no limit as regards the use of different base oils for preparing the compositions according to the invention, apart from the fact that they must, besides meeting the abovementioned viscosity criterion, have properties, notably in terms of viscosity index, sulfur content or resistance to oxidation, that are suitable for use for the propulsion systems of an electric or hybrid vehicle.

According to one embodiment, the base oil(s) of a composition according to the invention are hydrocarbon-based oils, preferably alkanes.

Still according to this embodiment, the base oil(s) may be chosen from alkanes comprising at least 8 carbon atoms, for example between 8 and 22 carbon atoms, preferably between 15 and 22 carbon atoms. For example, they may be $C_8$-$C_{22}$ and preferably $C_{15}$-$C_{22}$ alkanes.

The base oils of the compositions according to the invention may also be chosen from synthetic oils, such as certain esters of carboxylic acids and of alcohols, from poly-α-olefins (PAO) and from polyalkylene glycols (PAG) obtained by polymerization or copolymerization of alkylene oxides comprising from 2 to 8 carbon atoms, in particular from 2 to 4 carbon atoms.

The PAOs used as base oils are obtained, for example, from monomers comprising from 4 to 32 carbon atoms, for example from octene or decene.

The weight-average molecular mass of the PAO may vary quite broadly. Preferably, the weight-average molecular mass of the PAO is less than 600 Da. The weight-average molecular mass of the PAO may also range from 100 to 600 Da, from 150 to 600 Da or from 200 to 600 Da.

For example, the PAOs used in the context of the invention, having a kinematic viscosity, measured at 100° C. according to the standard ASTM D445, ranging from 1.5 to 8 mm²/s are sold commercially by Ineos under the brand names Durasyn® 162, Durasyn® 164, Durasyn® 166 and Durasyn® 168.

The esters of carboxylic acids and of alcohols are, for example, diesters of formula (II):

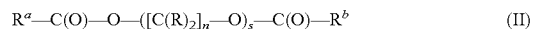

$$R^a\text{—}C(O)\text{—}O\text{—}([C(R)_2]_n\text{—}O)_s\text{—}C(O)\text{—}R^b \qquad (II)$$

in which:
R represent, independently of each other, a hydrogen atom or a linear or branched (C1-C5)alkyl group, in particular a methyl, ethyl or propyl group, notably methyl;
s is 1, 2, 3, 4, 5 or 6;
n is 1, 2 or 3; it being understood that when s is other than 1, n may be identical or different; and
$R^a$ and $R^b$, which may be identical or different, represent, independently of each other, saturated or unsaturated, linear or branched hydrocarbon-based groups, bearing a linear chain of 6 to 18 carbon atoms.

Preferably, when s and n are identical and equal to 2, at least one of the groups R represents a linear or branched ($C_1$-$C_5$)alkyl group; and when s is 1 and n is 3, at least one of the groups R bonded to the carbon in the beta position relative to the oxygen atoms of the ester functions represents a hydrogen atom.

Advantageously, the base oil(s) of the composition according to the invention are chosen from poly-α-olefins (PAOs).

Preferably, a composition according to the invention comprises a fluid base formed from one or more base oils with a kinematic viscosity measured at 100° C. according to the standard ASTM D445 of between 1.5 and 8 mm²/s.

In other words, a composition according to the invention may be free of base oil or mixture of base oils not meeting the kinematic viscosity criterion measured at 100° C. according to the standard ASTM D445, in particular free of base oil or mixture of base oils having a viscosity of greater than 9 mm²/s.

In particular, the base oil may be chosen from alkanes comprising at least 8 carbon atoms, for example between 8 and 22 carbon atoms, preferably between 15 and 22 carbon atoms or from synthetic oils of the type such as esters of carboxylic acids and of alcohols, poly-α-olefins (PAOs) or polyalkylene glycols (PAGs) obtained by polymerization or copolymerization of alkylene oxides comprising from 2 to 8 carbon atoms, in particular from 2 to 4 carbon atoms.

It falls to a person skilled in the art to adjust the content of fluid base to be used in a composition according to the invention to achieve the desired viscosity for the composition.

As indicated previously, the fluid base affords the lubricant and cooling potential of the composition according to the invention. In particular, the fluidity of the base notably affords good cooling properties during the use of the composition in contact with the batteries of a propulsion system of an electric or hybrid vehicle.

The cooling properties of the composition used are more advantageously increased by the shear applied to the composition on injection, which brings the fluid to a viscosity level lower than at rest.

In particular, a composition used according to the invention comprises from 60% to 99.5% by weight, preferably from 70% to 98%, for example from 80% to 99.5% by weight, even more preferentially from 80% to 98%, advantageously from 90% to 97% by weight of base oil, or of mixture of base oils, with a kinematic viscosity measured at 100° C. according to the standard ASTM D445 ranging from 1.5 to 8 mm$^2$/s, relative to the total weight of the composition.

Hydrocarbon-Based Fluid

The composition for cooling a propulsion system of an electric or hybrid vehicle according to the present invention may comprise at least one hydrocarbon-based fluid with a boiling point of greater than or equal to 50° C.

According to a particular embodiment of the invention, the hydrocarbon-based fluid has a boiling point of between 50° C. and 350° C., in particular between 60° C. and 250° C. and even more particularly between 80° C. and 200° C.

Preferably, the hydrocarbon-based fluid in accordance with the invention has a content of carbon of biological origin of greater than or equal to 90% by weight relative to the total weight of the hydrocarbon-based oil.

For the purposes of the present invention, the term "hydrocarbon-based fluid" means any fluid comprising saturated or unsaturated, linear hydrocarbon molecules, which may also comprise aromatic or cyclic groups, or heteroatoms.

Advantageously, the hydrocarbon-based fluid in accordance with the invention is a hydrocarbon comprising at least 8 carbon atoms, for example between 8 and 22 carbon atoms, preferably between 15 and 22 carbon atoms. For example, it may be $C_8$-$C_{22}$ and preferably $C_{15}$-$C_{22}$ alkane.

Advantageously, the hydrocarbon-based fluid in accordance with the invention is totally saturated. Preferably, the components of the hydrocarbon-based fluid are chosen from isoparaffins comprising from 12 to 30 carbon atoms, preferentially from 13 to 19 carbon atoms and more preferentially from 14 to 18 carbon atoms.

The cooling composition according to the invention advantageously comprises a weight content of isohexadecane of less than or equal to 50%.

According to a particular embodiment of the invention, the hydrocarbon-based fluid comprises alkanes, or saturated linear hydrocarbon molecules bearing a noncyclic chain, in particular comprising between 12 and 30 carbon atoms, in a content of between 80% and 100% by weight, relative to the total weight of the hydrocarbon-based fluid, or even between 90% and 100% by weight, for example between 95% and 100% by weight.

In the context of the present invention, the term "paraffins" denotes straight-chain hydrocarbons (also known as "normal paraffins") or branched-chain hydrocarbons (also known as "isoparaffins").

As heteroatoms, in the context of the present invention, mention may notably be made of nitrogen and oxygen.

According to a particular embodiment of the invention, the hydrocarbon-based fluid comprises from 90% to 100% by weight of isoparaffins, a content of normal paraffins ranging from 0 to 10% by weight and a content of carbons of biological origin of greater than or equal to 90% by weight relative to the total weight of the hydrocarbon-based fluid.

The hydrocarbon-based fluid advantageously comprises a content of greater than or equal to 90% by weight, in particular greater than or equal to 95% by weight and even more advantageously greater than or equal to 98% by weight of isoparaffins, relative to the total weight of hydrocarbon-based fluid.

According to one embodiment of the invention, the isoparaffins present in the hydrocarbon-based fluid include from 12 to 30 carbon atoms, preferably from 13 to 19 carbon atoms and even more preferably from 14 to 18 carbon atoms.

The hydrocarbon-based fluid advantageously comprises a content of normal paraffins of less than or equal to 10% by weight, preferentially less than or equal to 5% by weight and even more preferentially less than or equal to 2% by weight, relative to the total weight of hydrocarbon-based fluid.

The isoparaffins are advantageously noncyclic isoparaffins. Preferably, the hydrocarbon-based fluid has a mass ratio of isoparaffins to normal paraffins of at least 12/1, preferentially of at least 15/1 and more preferentially of at least 20/1. According to an even more particular embodiment, the hydrocarbon-based fluid does not comprise any normal paraffins.

According to one embodiment, the hydrocarbon-based fluid preferably comprises a weight content of isoparaffins ranging from 90% to 100% and a content of normal paraffins ranging from 0 to 10%, preferentially from 95% to 100% of isoparaffins chosen from alkanes including from 12 to 30 carbon atoms, preferably from 12 to 24 carbon atoms, more preferably from 12 to 22 carbon atoms.

According to a particular embodiment, the hydrocarbon-based fluid in accordance with the invention comprises a majority, i.e. more than 90% by weight, of molecules containing from 14 to 18 carbon atoms, such as isoparaffins.

According to another embodiment, the hydrocarbon-based fluid in accordance with the invention comprises from 60% to 95% by weight, preferably from 80% to 98% by weight, of isoparaffins chosen from the group consisting of C15 isoparaffins, C16 isoparaffins, C17 isoparaffins, C18 isoparaffins and mixtures of two or more thereof.

According to one embodiment, the hydrocarbon-based fluid comprises:
- isoparaffins containing 15 carbon atoms and isoparaffins containing 16 carbon atoms in a total amount ranging from 80% to 98% by weight relative to the total weight of the hydrocarbon-based fluid, or
- isoparaffins containing 16 carbon atoms, isoparaffins containing 17 carbon atoms and isoparaffins containing 18 carbon atoms in a total amount ranging from 80% to 98% by weight relative to the total weight of the hydrocarbon-based fluid, or
- isoparaffins containing 17 carbon atoms and isoparaffins containing 18 carbon atoms in a total amount ranging from 80% to 98% by weight relative to the total weight of the hydrocarbon-based fluid.

According to a preferred embodiment of the invention, the hydrocarbon-based fluid comprises isoparaffins containing 17 carbon atoms and isoparaffins containing 18 carbon atoms in a total amount ranging from 80% to 98% by weight relative to the total weight of the hydrocarbon-based fluid.

Examples of hydrocarbon-based fluids that are preferred according to the invention are those comprising:
- from 30% to 70% by weight of C15 isoparaffins and from 30% to 70% by weight of C16 isoparaffins, preferably from 40% to 60% by weight of C15 isoparaffins and from 35% to 55% by weight of C16 isoparaffins, relative to the total weight of the hydrocarbon-based fluid,
- from 5% to 25% of C15 isoparaffins, from 30% to 70% of C16 isoparaffins and from 10% to 40% of C17 isoparaffins, preferably from 8% to 15% of C15 isoparaffins, from 40% to 60% of C16 isoparaffins and from 15% to 25% of C17 isoparaffins, relative to the total weight of the hydrocarbon-based fluid,
- from 5% to 30% of C17 isoparaffins and from 70% to 95% of C18 isoparaffins, preferably from 10% to 25% of C17 isoparaffins and from 70% to 90% of C18 isoparaffins, relative to the total weight of the hydrocarbon-based fluid.

The hydrocarbon-based fluid preferably comprises a weight content of naphthenic compounds of less than or equal to 3%, preferentially less than or equal to 1%, more preferentially less than or equal to 0.5% and even more preferentially less than or equal to 500 ppm, or even 100 ppm or 50 ppm.

According to another preferred embodiment, the hydrocarbon-based fluid comprises a weight content of isoparaffins ranging from 90% to 100%, a weight content of normal paraffins ranging from 0 to 10% and a weight content of naphthenic compounds of less than or equal to 1%. Preferentially, the hydrocarbon-based fluid comprises a weight content of isoparaffins ranging from 95% to 100%, from 0 to 5% of normal paraffins and a weight content of naphthenic compounds of less than or equal to 0.5%. More preferentially, it comprises a weight content of isoparaffins ranging from 98% to 100%, from 0 to 2% of normal paraffins and a weight content of naphthenic compounds of less than or equal to 100 ppm.

The hydrocarbon-based fluid is advantageously free of aromatic compounds. The term "free" means a weight content of aromatic compounds of less than or equal to 500 ppm, preferably less than or equal to 300 ppm, preferentially less than or equal to 100 ppm, more preferentially less than or equal to 50 ppm, and advantageously less than or equal to 20 ppm, measured, for example, by UV spectrometry.

The weight content of isoparaffins, of normal paraffins, of naphthenic compounds and/or of aromatic compounds in the hydrocarbon-based fluid may be determined according to methods that are well known to those skilled in the art. By way of nonlimiting example, mention may be made of a gas chromatography method.

According to another preferred embodiment, the hydrocarbon-based fluid comprises a weight content of isoparaffins ranging from 90% to 100%, a weight content of normal paraffins ranging from 0 to 10%, a weight content of naphthenic compounds of less than or equal to 1% and a weight content of aromatic compounds of less than or equal to 500 ppm. Preferentially, the hydrocarbon-based fluid comprises a weight content of isoparaffins ranging from 95% to 100%, from 0 to 5% of normal paraffins, a weight content of naphthenic compounds of less than or equal to 0.5% and a weight content of aromatic compounds of less than or equal to 300 ppm, preferably less than 100 ppm, preferentially less than 50 ppm and advantageously less than 20 ppm. Preferentially also, the hydrocarbon-based fluid comprises a weight content of isoparaffins ranging from 95% to 100%, from 0 to 5% of normal paraffins and a weight content of aromatic compounds of less than or equal to 100 ppm. More preferentially, it comprises a weight content of isoparaffins ranging from 98% to 100%, from 0 to 2% of normal paraffins, a weight content of naphthenic compounds of less than or equal to 100 ppm and a weight content of aromatic compounds of less than or equal to 100 ppm.

The hydrocarbon-based fluid also preferably has an extremely low weight content of sulfur-based compounds, typically less than or equal to 5 ppm, preferentially less than or equal to 3 ppm and more preferentially less than or equal to 0.5 ppm, at a level too low to be detected by means of conventional low-sulfur-content analyzers.

The hydrocarbon-based fluid also preferably has a flash point of greater than or equal to 110° C., preferentially greater than or equal to 120° C. and more preferentially greater than or equal to 140° C. according to the standard EN ISO 2719. A high flash point, typically greater than 110° C. makes it possible, inter alia, firstly to overcome the safety problems during storage and transportation by avoiding excessively sensitive flammability of the hydrocarbon-based fluid.

The hydrocarbon-based fluid also preferably has a vapor pressure at 20° C. of less than or equal to 0.01 kPa.

According to one embodiment, the hydrocarbon-based fluid also preferably has a flash point of greater than or equal to 110° C. according to the standard EN ISO 2719 and a vapor pressure at 20° C. of less than or equal to 0.01 kPa. Preferentially, the hydrocarbon-based fluid has a flash point of greater than or equal to 120° C. and a vapor pressure at 20° C. of less than or equal to 0.01 kPa. More preferentially, it has a flash point of greater than or equal to 140° C. and a vapor pressure at 20° C. of less than or equal to 0.01 kPa.

The hydrocarbon-based fluid has a boiling point, a flash point and a vapor pressure which make it possible to overcome the flammability, odor and volatility problems.

The hydrocarbon-based fluid also preferably has a kinematic viscosity at 40° C. of less than or equal to 5 cSt, preferentially less than or equal to 4 cSt and more preferentially less than or equal to 3.5 cSt according to the standard EN ISO 3104.

Process for Obtaining the Hydrocarbon-Based Fluid:

Such hydrocarbon-based fluids may be obtained in the following manner. The hydrocarbon-based fluid in accordance with the invention is a hydrocarbon cut obtained from the conversion of biomass.

In the context of the present invention, the term "obtained from the conversion of biomass" refers to a hydrocarbon cut produced from starting materials of biological origin.

Preferably, the hydrocarbon cut of biological origin is obtained via a process comprising hydrodeoxygenation (HDO) and isomerization (ISO) steps. The hydrodeoxygenation (HDO) step leads to the decomposition of the structures of the biological esters or of the triglyceride constituents, to the elimination of the oxygen-based, phosphorus-based and sulfur-based compounds and to the hydrogenation of the olefinic bonds. The product obtained from the hydrodeoxygenation reaction is then isomerized. A fractionation step may preferably follow the hydrodeoxygenation and isomerization steps. Advantageously, the fractions of interest are then subjected to hydrotreating and then distillation steps in order to obtain the specifications of the desired hydrocarbon-based fluid according to the invention.

This HDO/ISO process is performed on a raw biological feedstock, also known as biomass or starting material of biological origin, selected from the group consisting of plant oils, animal fats, fish oils and a mixture thereof. The suitable starting materials of biological origin are, for example, rapeseed oil, canola oil, tall oil, sunflower oil, soybean oil, hemp oil, olive oil, linseed oil, mustard oil, palm oil, groundnut oil, castor oil, coconut oil, animal fats such as tallow, recycled food fats, starting materials obtained from genetic engineering, and biological starting materials produced from microorganisms such as algae and bacteria. Condensation products, esters or other derivatives obtained from raw biological materials may also serve as starting materials.

Preferably, the starting material of biological origin is an ester or a triglyceride derivative. This material is first subjected to a hydrodeoxygenation (HDO) step to decompose the structure of the constituent esters or triglycerides and to eliminate the oxygen-based, phosphorus-based and sulfur-based compounds concomitantly with the hydrogenation of the olefinic bonds. This step of hydrodeoxygenation (HDO) of the starting material of biological origin is followed by isomerization of the product thus obtained, leading to branching of the hydrocarbon-based chain and to an improvement in the properties of the paraffin at low temperatures.

During the HDO step, hydrogen and the starting material of biological origin are passed over a hydrodeoxygenation catalytic bed simultaneously or counter-currentwise. During the HDO step, the pressure and the temperature are between 20 and 150 bar and between 200 and 500° C., respectively. Conventional and known hydrodeoxygenation catalysts are used during this step. Optionally, the starting material of biological origin may be subjected to a prehydrogenation under mild conditions to avoid side reactions of the double bonds before the HDO step. After the hydrodeoxygenation step, the product obtained from the reaction is subjected to an isomerization (ISO) step in which hydrogen and the product, and optionally a mixture of n-paraffins, are passed over isomerization catalytic beds simultaneously or counter-currentwise. During the ISO step, the pressure and the temperature are between 20 and 150 bar and between 200 and 500° C., respectively. Conventional and known isomerization catalysts are used during this step.

Additional secondary processes may also be performed (such as intermediate mixing operations, trapping operations or other processes of this type).

The product obtained from the HDO/ISO steps may optionally be fractionated in order to obtain the cuts of interest.

Various HDO/ISO processes are described in the literature. Patent application WO 2014/033762 describes a process comprising a prehydrogenation step, a hydrodeoxygenation (HDO) step and an isomerization step which are performed counter-currentwise. Patent application EP1728844 describes a process for producing hydrocarbon-based compounds from a mixture of compounds of plant and animal origin. This process comprises a step of pretreating the mixture making it possible to remove the contaminants, for instance the alkali metal salts, followed by a hydrodeoxygenation (HDO) step and an isomerization step. Patent application EP2084245 describes a process for producing a hydrocarbon-based mixture which may be used as gas oil or in a gas oil composition by hydrodeoxygenation of a mixture of biological origin containing fatty acid esters optionally mixed with free fatty acids, for example plant oils such as sunflower oil, rapeseed oil, canola oil, palm oil or pine oil, followed by hydroisomerization over specific catalysts. Patent application EP2368967 describes such a process and the product obtained via this process. Patent application WO 2016/185046 describes a process for obtaining a hydrocarbon-based fluid used according to the invention, in which the hydrocarbon-based fluid is obtained via a process of catalytic hydrogenation at a temperature of from 80° C. to 180° C. and at a pressure of from 50 bar to 160 bar of a deoxygenated and/or isomerized feedstock of biological origin. This process is advantageously used in the context of obtaining the hydrocarbon-based fluid in accordance with the present invention.

Advantageously, the starting material of biological origin contains less than 15 ppm of sulfur, preferably less than 8 ppm, preferentially less than 5 ppm and more preferentially less than than 1 ppm according to the standard EN ISO 20846. Ideally, the feedstock does not comprise any sulfur as starting material of biobased origin.

Before the hydrotreating step, a prefractionation step may take place. A narrower cut at the hydrogenation unit inlet makes it possible to obtain a narrow cut at the unit outlet. Specifically, the boiling points of prefractionated cuts are between 220 and 330° C. whereas the cuts which have not been prefractionated typically have boiling points of between 150 and 360° C.

The deoxygenated and isomerized feedstock obtained from the HDO/ISO process is then hydrogenated.

The hydrogen used in the hydrogenation unit is typically highly purified hydrogen. The term "highly purified" refers to hydrogen with a purity, for example, of greater than 99%, although other grades may also be used.

The hydrogenation step is performed by means of catalysts. The typical hydrogenation catalysts may be either bulk or supported catalysts and may comprise the following metals: nickel, platinum, palladium, rhenium, rhodium, nickel tungstate, nickel-molybdenum, molybdenum, cobalt-molybdenum. The supports may be silica, alumina, silica-alumina or zeolites.

A preferred catalyst is a catalyst based on nickel on an alumina support, the specific surface area of which ranges between 100 and 200 $m^2$/g of catalyst or a nickel-based bulk catalyst. The hydrogenation conditions are typically as follows:

Pressure: 50 to 160 bar, preferably 80 to 150 bar and more preferentially 90 to 120 bar;

Temperature: 80 to 180° C., preferably 120 to 160° C. and more preferentially 150 to 160° C.;

Hourly space velocity (HSV): 0.2 to 5 $hr^{-1}$, preferably 0.4 to 3 $hr^{-1}$ and more preferentially 0.5 to 0.8 $hr^{-1}$;

Degree of treatment with hydrogen: adapted to the conditions mentioned above and possibly ranging up to 200 $Nm^3$/tonne of feedstock to be treated.

The temperature in the reactors is typically between 150 and 160° C. with a pressure of about 100 bar, whereas the hourly space velocity is about 0.6 $hr^{-1}$ with a degree of treatment adapted as a function of the quality of the feedstock to be treated and of the parameters of the first hydrogenation reactor.

The hydrogenation may take place in one or more reactors in series. The reactors may comprise one or more catalytic beds. The catalytic beds are generally fixed catalytic beds.

The hydrogenation process preferably comprises two or three reactors, preferably three reactors, and is more preferentially performed in three reactors in series.

The first reactor traps the sulfur-based compounds and performs the hydrogenation of essentially all the unsaturated compounds and up to about 90% of the aromatic compounds. The product obtained from the first reactor is substantially free of sulfur-based compound. In the second stage, i.e. in the second reactor, the hydrogenation of the aromatic compounds continues and up to 99% of the aromatic compounds are thus hydrogenated.

The third stage in the third reactor is a finishing stage for obtaining aromatic compound contents of less than or equal to 500 ppm, preferably less than or equal to 300 ppm, preferentially less than or equal to 100 ppm, more preferentially less than or equal to 50 ppm, and ideally less than or equal to 20 ppm even in the case of products with a high boiling point, for example greater than 300° C.

It is possible to use a reactor which includes two, three or more catalytic beds. The catalysts may be present in variable or essentially equal amounts in each reactor; for three reactors, the amounts as a function of the weight may be, for example, 0.05-0.5/0.10-0.70/0.25-0.85, preferably 0.07-0.25/0.15-0.35/0.4-0.78 and more preferentially 0.10-0.20/0.20-0.32/0.48-0.70.

It is also possible to use one or two hydrogenation reactors instead of three.

It is also possible for the first reactor to be composed of twin reactors used alternately. This operating mode notably allows facilitated loading and unloading of the catalysts: when the first reactor comprises the catalyst that is saturated first (substantially all the sulfur is trapped on and/or in the catalyst) it must be changed regularly.

Use may also be made of a single reactor in which two, three or more catalytic beds are installed.

It may be necessary to insert quench boxes (for quenching the reaction) into the recycling system or between the reactors to cool the effluents from one reactor to another or from one catalytic bed to another so as to control the temperatures and the hydrothermal equilibrium of each reaction. According to a preferred embodiment, there are no cooling or quenching intermediates.

According to one embodiment, the product obtained from the process and/or the gases separated out are at least partly recycled into the system for feeding the hydrogenation reactors. This dilution contributes toward maintaining the exothermicity of the reaction within controlled limits, in particular in the first stage. The recycling also permits heat exchange before the reaction and also better control of the temperature.

The effluent from the hydrogenation unit mainly contains the hydrogenated product and hydrogen. Flash separators are used to separate the gas-phase effluents, mainly the residual hydrogen, and the liquid-phase effluents, mainly the hydrogenated hydrocarbon cuts. The process may be performed using three flash separators, one at high pressure, one at intermediate pressure and one at low pressure very close to atmospheric pressure.

The hydrogen gas that is collected at the top of the flash separators may be recycled into the system for feeding the hydrogenation unit or at different levels in the hydrogenation units between the reactors.

According to one embodiment, the final product is separated out at atmospheric pressure. It then directly feeds a vacuum fractionation unit. Preferably, the fractionation will be performed at a pressure of between 10 and 50 mbar and more preferentially at about 30 mbar.

The fractionation may be performed so that it is possible to simultaneously withdraw various hydrocarbon-based fluids from the fractionation column and so that their boiling point can be predetermined.

By adapting the feedstock via its initial and final boiling points, the hydrogenation reactors, the separators and the fractionation unit may thus be connected directly without it being necessary to use intermediate tanks. This integration of the hydrogenation and the fractionation allows optimized thermal integration combined with a reduction in the number of devices and energy saving.

The hydrocarbon-based fluid in accordance with the invention having a content of carbon of biological origin of greater than or equal to 90% by weight relative to the total weight of the hydrocarbon-based oil is ideally obtained from the treatment of starting materials of biological origin. The carbon of a biomaterial originates from plant photosynthesis and thus from atmospheric $CO_2$. The degradation (the term "degradation" also means the combustion/incineration at the end of the life) of these $CO_2$-based materials therefore does not contribute toward warming since there is no increase in the carbon emitted into the atmosphere. The $CO_2$ evaluation of biomaterials is thus markedly better and contributes toward reducing the carbon footprint of the products obtained (only the energy for the manufacture should be taken into account). In contrast, a material of fossil origin also degraded into $CO_2$ will contribute toward increasing the $CO_2$ level and thus toward global warming. The hydrocarbon-based fluid used according to the invention will thus have a carbon footprint that is better than that of compounds obtained from a fossil source.

The term "biocarbon" indicates that the carbon is of natural origin and comes from a biomaterial, as indicated below. The biocarbon content and the biomaterial content are terms indicating the same value. A material of renewable origin or a biomaterial is an organic material in which the carbon is derived from $CO_2$ that has been recently (on a human timescale) fixed by photosynthesis from the atmosphere. A biomaterial (carbon of 100% natural origin) has a $^{14}C/^{12}C$ isotope ratio of greater than $10^{-12}$, typically of about $1.2 \times 10^{-12}$, whereas a fossil material has a zero ratio. Specifically, the $^{14}C$ isotope is formed in the atmosphere and is then integrated by photosynthesis, over a timescale of a few tens of years at most. The half-life of $^{14}C$ is 5730 years. Thus, materials obtained from photosynthesis, i.e. plants in general, necessarily have a maximum $^{14}C$ isotope content.

Determination of the biomaterial or biocarbon content is given in accordance with the standards ASTM D 6866-12, method B (ASTM D 6866-06) and ASTM D 7026 (ASTM D 7026-04). The standard ASTM D 6866 concerns the "determination of biobased content of materials of the natural range using radiocarbide and isotope ratio analysis by mass spectrometry", whereas the standard ASTM D 7026 concerns the "sampling and reporting of results for the determination of biobased content via carbon isotope analysis". The second standard mentions the first in its first paragraph.

The first standard describes a test for measuring the $^{14}C/^{12}C$ ratio of a sample and compares it with the $^{14}C/^{12}C$ ratio of a reference sample of 100% renewable origin, to give a relative percentage of C of renewable origin in the sample. The standard is based on the same concepts as $^{14}C$ dating, but without applying the dating equations. The ratio thus calculated is indicated as "pMC" (percentage of Modern Carbon). If the material to be analyzed is a mixture of biomaterials and of fossil materials (having no radioactive isotope), the pMC value obtained is directly correlated to the amount of biomaterial present in the sample. The reference value used for $^{14}C$ dating is a value dating from the 1950s. That year was selected on account of the existence of atmospheric nuclear tests which introduced large amounts of isotopes into the atmosphere after that date. The 1950 reference corresponds to a pMC value of 100. Taking the thermonuclear tests into account, the current value to be adopted is about 107.5 (which corresponds to a correction factor of 0.93). The radioactive carbon signature of a current plant is thus 107.5. A signature of 54 pMC and 99 pMC thus corresponds to an amount of biomaterial in the sample of 50% and 93%, respectively.

The hydrocarbon-based fluid in accordance with the invention has a biomaterial content of at least 90%. This content is advantageously higher, in particular greater than or equal to 95%, preferably greater than or equal to 98% and advantageously equal to 100%.

According to one embodiment, the $^{14}C/^{12}C$ isotope ratio of the hydrocarbon-based fluid used in the invention is between 1.15 and $1.2 \times 10^{12}$.

In addition to a particularly high biomaterial content, the hydrocarbon-based fluid in accordance with the invention has particularly good biodegradability. The biodegradation of an organic chemical product refers to the reduction in complexity of chemical compounds by means of the metabolic activity of microorganisms. Under aerobic conditions, microorganisms transform organic substances into carbon dioxide, water and biomass. The OCDE 306 method is used for evaluating the biodegradability of individual substances in seawater. According to this method, the hydrocarbon-based fluid has a 28-day biodegradability of at least 60%, preferably of at least 70%, more preferably of at least 75% and advantageously of at least 80%.

The OCDE 306 method is as follows:

The closed bottle method consists in dissolving a predetermined amount of the test substance in a control medium at a concentration conventionally of 2-10 mg/L, one or more concentrations optionally being used. The solution is kept in a filled closed bottle protected from light, at a constant temperature in the range of 15-20° C. The degradation is monitored by oxygen analysis over a period of 28 days. 24 bottles are used (8 for the test substance, 8 for the reference compound and 8 for the nutrients). All the analyses are performed on several bottles. At least four determinations of dissolved oxygen are performed (day 0, 5, 15 and 20) using a chemical or electrochemical method.

According to a particular embodiment of the invention, the hydrocarbon-based fluid comprises:
- a weight content of isoparaffins ranging from 95% to 100% and preferentially from 98% to 100% relative to the total weight of the hydrocarbon-based fluid; and
- a weight content of normal paraffins of less than or equal to 5% and preferentially less than or equal to 2% relative to the total weight of the hydrocarbon-based fluid; and
- a weight content of naphthenic compounds of less than or equal to 0.5% and preferentially less than or equal to 100 ppm relative to the total weight of the hydrocarbon-based fluid; and
- a weight content of aromatic compounds of less than or equal to 300 ppm, preferentially less than or equal to 100 ppm, more preferably less than or equal to 50 ppm and advantageously less than or equal to 20 ppm relative to the total weight of the hydrocarbon-based fluid.

According to a particular embodiment of the invention, the hydrocarbon-based fluid has a weight content of isoparaffins ranging from 98% to 100%, relative to the total weight of the hydrocarbon-based fluid, and a kinematic viscosity at 40° C. of less than or equal to
  5 cSt, preferably less than or equal to 4 cSt and preferentially less than or equal to 3.5 cSt.

Advantageously, a composition used according to the invention comprises from 80% to 99.5%, even more preferentially from 80% to 98%, advantageously from 90% to 97% by weight of at least one base oil or of at least one hydrocarbon-based fluid with a boiling point of greater than or equal to 50° C., relative to the total weight of the composition.

Fire Retardant

In the context of the present invention, at least one fire retardant is incorporated into the cooling composition of a propulsion system of an electric or hybrid vehicle, corresponding to formula (I)

in which
  $R_F$ is a perfluorinated or partially fluorinated group, in particular including from 1 to 22, preferably from 1 to 20 and even more preferentially from 1 to 16 carbon atoms,
  $R_H$ is a hydrocarbon-based group, in particular including from 1 to 22, preferably from 1 to 20 and even more preferentially from 1 to 16 carbon atoms, and
  L is a linker.

In the context of the present invention, the term "partially fluorinated group" means that at least 60% of the hydrogen atoms in the group concerned have been replaced with fluorine atoms, for example between 60% and 80%.

Without the Applicant being bound by any theory, it is described that the presence of at least one fire retardant of formula (I) is suitable for forming micelles in the cooling composition. In the event of heating liable to be caused by a fire, the micelles will be present at the surface of the composition, making it possible to combat the fire.

According to a particular embodiment, the group $R_F$ includes between 1 and 22, preferably between 1 and 20 and more particularly between 1 and 16 carbon atoms. Said group may optionally be interrupted with 1 to 4 heteroatoms chosen from a nitrogen atom and an oxygen atom. This group may moreover be linear or branched.

Advantageously, it is a perfluorinated or partially fluorinated $(C_1-C_{16})$alkyl group optionally interrupted with one or two heteroatoms chosen from a nitrogen atom and an oxygen atom.

Such a group $R_F$ may be chosen, for example, from the following groups:

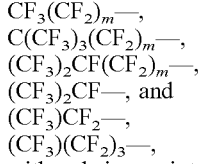

with m being an integer which may be between 1 and 15, m being an integer between 0 and 14.

These examples are not limiting.

According to another particular embodiment, the group $R_H$ includes between 1 and 22 carbon atoms, more particularly between 8 and 22 carbon atoms. According to a particular embodiment, this group $R_H$ may comprise between 1 and 4 heteroatoms chosen from a nitrogen atom and an oxygen atom. This group may moreover be linear or branched. It may moreover be saturated or may comprise from 1 to 4 unsaturations.

According to another embodiment, the group $R_H$ may preferably include between 3 and 22 carbon atoms, more preferentially between 3 and 18, for example between 5 and 15, or even between 10 and 15 carbon atoms.

Advantageously it is a $(C_1-C_{15})$alkyl, notably $(C_3-C_{15})$ alkyl or $(C_2-C_{15})$alkenyl group, said group being optionally substituted with a hydrocarbon-based ring such as the $(C_3-C_6)$cycloalkyl, phenyl or benzyl group.

Such a group $R_H$ may notably be chosen from the following groups, without, however, being limited thereto:
- —$(CH_2)_n CH_3$,
- —$(CH_2)_p C_6 H_4$,
- —$(CH_2)_q O(CH_2)_r CH_3$, and
- —$(CH_2)_s C$=$C(CH_2)_t CH_3$ with n being an integer which may be between 1 and 21, for example between 2 and 21, in particular between 7 and 21, p being between 1 and 16, in particular between 2 and 10, q and r being independently between 1 and 16, with q+r being less than or equal to 21 and advantageously greater than 7, s and t being independently between 1 and 16, with s+t being less than or equal to 19 and advantageously greater than 5.

The linker L may notably be chosen from the following divalent groups: —$CH_2$—, —CH=CH—, —O—, —S— or —$PO_4$—.

According to a particular embodiment, the fire retardant may be chosen from the compounds of formula (I) in which $R_F$ is a perfluorinated or partially fluorinated ($C_2$-$C_{12}$)alkyl group, $R_H$ is a ($C_1$-$C_{12}$)alkyl, notably ($C_3$-$C_{12}$)alkyl, in particular ($C_6$-$C_{12}$)alkyl or ($C_2$-$C_{12}$)alkenyl, in particular ($C_6$-$C_{12}$)alkenyl group, said group being optionally substituted with a hydrocarbon-based ring such as the ($C_3$-$C_6$)cycloalkyl, phenyl or benzyl group, and said group possibly being interrupted with one or two heteroatoms chosen from nitrogen and oxygen, and L is a linker chosen from —$CH_2$—, —CH=CH— and —O—.

It is understood in the context of the present invention that the fire retardant of formula (I) as defined previously may be in the form of a mixture of fire retardants of formula (I) as defined previously.

In the context of the present invention, the following terms are defined as follows:
- "($C_1$-$C_x$)alkyl" refers to a linear or branched, saturated hydrocarbon-based chain including from 1 to x carbon atoms, for example a ($C_1$-$C_{12}$)alkyl group. Nonlimiting examples that may be mentioned include the following groups: methyl, ethyl, 1-propyl, 2-propyl, butyl, pentyl, hexyl, heptyl and decyl;
- "($C_2$-$C_x$)alkenyl" refers to a linear or branched, unsaturated hydrocarbon-based chain including from 2 to x carbon atoms, for example a ($C_2$-$C_{12}$)alkyl group. Nonlimiting examples that may be mentioned include the following groups: ethylene, propylene, butylene, pentylene, hexylene and decylene;
- "($C_3$-$C_6$)cycloalkyl" refers to a saturated cyclic hydrocarbon-based chain. Nonlimiting examples that may be mentioned include the following groups: cyclopropyl, cyclobutyl, cyclopentyl and cyclohexyl.

According to the present invention, the fire retardant(s) of formula (I) may be present in a content of between 0.5% and 40% by weight, relative to the total weight of the composition in accordance with the present invention, in particular in a content of between 2% and 30% by weight, even more particularly in a content of between 2% and 20% by weight, advantageously between 3% and 10% by weight.

In terms of formulation of the composition according to the present invention, any method known to those skilled in the art may be used for this supplementation of the hydrocarbon-based fluid with at least one fire retardant.

Fluoro Compound

The cooling composition according to the present invention comprises at least one fluoro compound with a boiling point of between 50 and 250° C., preferably between 55° C. and 120° C.

Preferably, the fluoro compound with a boiling point of between 50 and 250° C., preferably between 55° C. and 120° C., is different from the fire retardant of formula (I) defined above.

In the context of the present invention, the fluoro compound denotes an organic compound including at least 5 fluorine atoms.

According to a particular embodiment of the invention, the fluoro compound includes at least 8 fluorine atoms, or even at least 10, or even at least 12 fluorine atoms.

According to another particular embodiment, the fluoro compound in accordance with the invention is a perfluorinated compound, i.e. a compound in which each hydrogen atom has been replaced with a fluorine atom.

According to a particular embodiment of the invention, said fluoro compound is chosen from perfluorooctane, perfluorocyclohexane and mixtures thereof.

According to one embodiment of the invention, the fluoro compound may be a mixture of fluoro compounds. Consequently, in the context of the present invention, when a fluoro compound is concerned, it may in reality be a mixture of fluoro compounds.

Without the inventors being bound by any theory, it is described that the fluoro compound having this particular boiling point range makes it possible to bring about the rupture of the micelles formed from the fire retardant of formula (I) as described previously in the event of overheating of the battery, thereby ensuring increased contact between the fluoro component of the fire retardant of formula (I) as described previously. In other words, when the battery overheats due to an abnormal temperature increase, by heat transfer, the fluoro compounds with a boiling point of between 50 and 250° C. become transformed into gas and as such the fire retardants migrate with, in parallel, the destruction of the micelles to the surface of the composition, in particular in contact with the battery or the power electronics, imparting the expected flame-retardant properties.

The fluoro compound may be present in the composition according to the invention in a content of between 0.01% and 20% by weight, in particular between 0.1% and 10% by weight and even more particularly between 0.2% and 5% by weight relative to the total weight of the composition.

According to one embodiment of the invention, the cooling composition comprises between 2% and 30% by weight, preferably between 2% and 20% by weight and advantageously between 3% and 10% by weight of at least one fire retardant of formula (I) as defined above and between 0.01% and 20% by weight, in particular between 0.1% and 10% by weight and preferably between 0.2% and 5% by weight of at least one fluoro compound with a boiling point of between 50° C. and 250° C., relative to the total weight of the composition.

According to yet another embodiment of the invention, the composition comprises at least one fire retardant of formula (I) and at least one fluoro compound with a boiling point of between 50° C. and 250° C. in a fire retardant/fluoro compound mass ratio of between 0.2 and 200, preferably between 0.5 and 50.

According to a particular embodiment of the invention, the fluoro compound with a boiling point of between 50° C. and 250° C. is different from the fire retardant corresponding to formula (I) and the base oil or the hydrocarbon-based fluid with a boiling point of greater than or equal to 50° C. is present in the composition in a content of greater than or equal to 80% by weight, preferably ranging from 80% to 99.5% by weight, relative to the total weight of the composition.

According to a particular embodiment of the invention, the composition comprises:
(i) from 60% to 99.5% by weight, preferably from 70% to 98% by weight, even more preferentially from 80% to 98% and advantageously from 90% to 97% by weight of at least one base oil or of at least one hydrocarbon-based fluid with a boiling point of greater than or equal to 50° C., relative to the total weight of the composition;
(ii) from 2% to 30% by weight, preferably from 2% to 20% and advantageously from
3% to 10% by weight of fire retardant corresponding to formula (I), relative to the total weight of the composition; and
(iii) from 0.01% to 20% by weight, preferably from 0.1% to 10% by weight and even more particularly from 0.2% to 5% by weight of fluoro compound with a boiling point of between 50° C. and 250° C., relative to the total weight of the composition.

The cooling composition in accordance with the invention may also comprise at least one free-radical inhibitor.

Such free-radical inhibitors are known per se to those skilled in the art and may be of various chemical nature and may in particular belong to various chemical families.

In terms of formulation of the composition according to the present invention, any method known to those skilled in the art may be used for this supplementation of the fluid.

Among the free-radical inhibitors, mention may notably be made of phosphorus-based free-radical inhibitors.

Among the phosphorus-based free-radical inhibitors that are distinguished are compounds for which the phosphorus is a P(V) or pentavalent phosphorus and compounds for which the phosphorus is a P(III) or trivalent phosphorus.

Among these compounds in the form of a pentavalent phosphorus, P(V), mention may notably be made of the phosphate family and in particular triethyl phosphate, trimethyl phosphate, optionally fluorinated alkyl phosphates, or aryl phosphates.

A fluorinated alkyl phosphate that may notably be mentioned is tris(2,2,2-trifluoroethyl) phosphate.

Aryl phosphates that may notably be mentioned include triphenyl phosphate, tricresyl phosphate and trixylenyl phosphate.

Still among these compounds in the form P(V), mention may notably be made of the phosphazene family. In this family, which is characterized in that the representatives thereof include at least one double bond between a pentavalent phosphorus atom and a nitrogen atom, cyclic compounds are favored. Mention may notably be mentioned of hexamethoxycyclotriphosphazene.

Among these compounds in the form of a trivalent phosphorus, P(III), mention may notably be made of the phosphite family. In this family, mention may notably be made of tris(2,2,2-trifluoroethyl) phosphite.

A cooling composition in accordance with the invention may also comprise at least one additional fire retardant, other than the fire retardant of formula (I) described above.

Among these other fire retardants, mention may notably be made of halogenated compounds other than fluoro compounds.

It falls to a person skilled in the art to adjust the proportions of the various constituents of the composition, notably of the fluid base, of the fire retardant of formula (I) as defined previously and optionally of the free-radical inhibitor and/or of the additional fire retardants, to comply with the viscosity required according to the invention, and optionally the density of the composition.

The fire retardant(s) of formula (I) as defined previously and optionally the free-radical inhibitor and/or the additional fire retardants may be incorporated directly into the hydrocarbon-based fluid in accordance with the present invention.

According to a particular embodiment, a cooling composition according to the invention comprises at least one hydrocarbon-based fluid comprising a content of greater than or equal to 90% by weight, in particular greater than or equal to 95% by weight and even more advantageously greater than or equal to 98% by weight of isoparaffins relative to the total weight of hydrocarbon-based fluid, at least one fire retardant of formula (I) as defined previously and optionally at least one phosphorus-based free-radical inhibitor.

According to a particular embodiment, a cooling composition according to the invention comprises at least one hydrocarbon-based fluid with a weight content of isoparaffins ranging from 98% to 100% relative to the total weight of the hydrocarbon-based fluid, and a kinematic viscosity at 40° C. of less than or equal to 5 cSt, preferably less than or equal to 4 cSt and preferentially less than or equal to 3.5 cSt, at least one fire retardant of formula (I) as defined previously and optionally a phosphorus-based free-radical inhibitor, notably as more particularly described previously.

Alternatively, a composition according to the invention may also comprise one or more additives as defined more precisely in the text hereinbelow.

Other Additives

According to one variant of the invention, the cooling composition according to the present invention also comprises additives which modify the properties of the base oil.

The additives that may be incorporated into a composition according to the invention may be chosen from detergents, dispersants, antioxidants, pour-point improvers, antifoams and mixtures thereof.

It is understood that the nature and amount of additives used are chosen so as not to affect the combined properties of cooling power of the composition according to the invention and fire protection.

A cooling composition according to the invention may comprise at least one antioxidant additive.

The antioxidant additive generally makes it possible to retard the degradation of the composition in service. This degradation may notably be reflected by the formation of deposits, the presence of sludges, or an increase in the viscosity of the composition.

The antioxidant additives notably act as free-radical inhibitors or hydroperoxide destroyers. Among the commonly used antioxidant additives, mention may be made of antioxidant additives of phenolic type, antioxidant additives of amine type and phospho-sulfur-based antioxidant additives. Some of these antioxidant additives, for example the phospho-sulfur-based antioxidant additives, may be ash generators. The phenolic antioxidants additives may be ash-free or may be in the form of neutral or basic metal salts. The antioxidants additives may notably be chosen from sterically hindered phenols, sterically hindered phenol esters and sterically hindered phenols comprising a thioether bridge, diphenylamines, diphenylamines substituted with at least one $C_1$-$C_{12}$ alkyl group, N,N'-dialkyl-aryl-diamines, and mixtures thereof.

Preferably according to the invention, the sterically hindered phenols are chosen from compounds comprising a phenol group, in which at least one carbon vicinal to the carbon bearing the alcohol function is substituted with at least one $C_1$-$C_{10}$ alkyl group, preferably a $C_1$-$C_6$ alkyl group, preferably a $C_4$ alkyl group, preferably with a tert-butyl group.

Amine compounds are another class of antioxidant additives that may be used, optionally in combination with the phenolic antioxidants additives. Examples of amine compounds are aromatic amines, for example the aromatic amines of formula $NR^4R^5R^6$ in which $R^4$ represents an optionally substituted aliphatic or aromatic group, $R^5$ represents an optionally substituted aromatic group, $R^6$ represents a hydrogen atom, an alkyl group, an aryl group or a group of formula $R^7S(O)_zR^8$ in which $R^7$ represents an alkylene group or an alkenylene group, $R^8$ represents an alkyl group, an alkenyl group or an aryl group and z represents 0, 1 or 2.

Sulfurized alkylphenols or the alkali metal or alkaline-earth metal salts thereof may also be used as antioxidant additives.

Another class of antioxidant additives is that of copper compounds, for example copper thio- or dithio-phosphates, copper salts of carboxylic acids, and copper dithiocarbamates, sulfonates, phenates and acetylacetonates. Copper I and II salts and succinic acid or anhydride salts may also be used.

A cooling composition according to the invention may contain any type of antioxidant additive known to those skilled in the art.

Advantageously, a cooling composition according to the invention comprises at least one ash-free antioxidant additive.

A cooling composition according to the invention may comprise from 0.5% to 2% by weight of at least one antioxidant additive, relative to the total mass of the composition.

A cooling composition according to the invention may also comprise at least one detergent additive.

The detergent additives generally make it possible to reduce the formation of deposits on the surface of metal parts by dissolving the oxidation and combustion byproducts.

The detergent additives that may be used in a cooling composition according to the invention are generally known to those skilled in the art. The detergent additives may be anionic compounds comprising a long lipophilic hydrocarbon-based chain and a hydrophilic head. The associated cation may be a metal cation of an alkali metal or an alkaline-earth metal.

The detergent additives are preferentially chosen from alkali metal or alkaline-earth metal salts of carboxylic acids, sulfonates, salicylates and naphthenates, and also phenate salts. The alkali metals and alkaline-earth metals are preferentially calcium, magnesium, sodium or barium.

These metal salts generally comprise the metal in a stoichiometric amount or in excess, thus in an amount greater than the stoichiometric amount. They are then overbased detergent additives; the excess metal giving the overbased nature to the detergent additive is then generally in the form of a metal salt that is insoluble in the oil, for example a carbonate, a hydroxide, an oxalate, an acetate or a glutamate, preferentially a carbonate.

A cooling composition according to the invention may comprise, for example, from 2% to 4% by weight of detergent additive, relative to the total mass of the composition.

A cooling composition according to the invention may also comprise at least one pour-point depressant additive.

By slowing down the formation of paraffin crystals, the pour-point depressant additives generally improve the cold-temperature behavior of the composition.

Examples of pour-point depressant additives that may be mentioned include polyalkyl methacrylates, polyacrylates, polyarylamides, polyalkylphenols, polyalkylnaphthalenes and polyalkylstyrenes.

Also, a cooling composition according to the invention may comprise at least one dispersant.

The dispersant may be chosen from Mannich bases, succinimides and derivatives thereof.

A cooling composition according to the invention may comprise, for example, from 0.2% to 10% by weight of dispersant relative to the total mass of the composition.

According to a particular embodiment, a composition according to the invention comprises, or even consists of:
(i) from 80% to 99.5% by weight, preferably from 80% to 98% and more preferentially from 90% to 97% by weight of at least one base oil or of at least one hydrocarbon-based fluid with a boiling point of greater than or equal to 50° C., preferably chosen from hydrocarbons comprising at least 8 carbon atoms, for example between 8 and 22 carbon atoms;
(ii) from 0.5% to 40%, preferably from 2% to 30% by weight, preferably from 2% to 20% and advantageously from 3% to 10% by weight of fire retardant corresponding to formula (I), in particular in which $R_F$ is a perfluorinated or partially fluorinated ($C_2$-$C_{12}$)alkyl group, $R_H$ is a ($C_6$-$C_{12}$)alkyl or ($C_6$-$C_{12}$)alkenyl group, said group being optionally substituted with a ($C_3$-$C_6$) cycloalkyl, phenyl or benzyl group, and said group possibly being interrupted with 1 or 2 heteroatoms chosen from nitrogen and oxygen, and L is a linker chosen from —$CH_2$—, —CH=CH— and —O—;
(iii) from 0.01% to 20% by weight, preferably from 0.1% to 10% by weight and even more particularly from 0.2% to 5% by weight of fluoro compound with a boiling point of between 50° C. and 250° C.; and
(iv) optionally from 0.1% to 10% of one or more additives chosen from phosphorus-based free-radical inhibitors, detergents, dispersants, antioxidants, pour-point improvers, antifoams and mixtures thereof;
the contents being expressed relative to the total weight of the composition.

Application

As indicated previously, a composition according to the invention may be used, by virtue of its combined properties in terms of cooling and fire retarding, both as a coolant fluid for a propulsion system of an electric or hybrid vehicle, and more particularly for the power electronics and the batteries, and as a fluid for retarding and/or preventing fire propagation for the batteries.

Advantageously, the composition according to the invention is placed in contact with the battery, by immersion or semi-immersion, to act both as a coolant and as a fire protection agent with respect to batteries.

The term "immersion" means that all of the battery is surrounded with the cooling composition according to the present invention. The term "semi-immersion" means that only part of the battery is in contact with said composition.

Alternatively, the cooling composition according to the invention is advantageously placed in direct contact with the batteries via methods described below.

As batteries that are suitable for the propulsion systems of an electric or hybrid vehicle, mention is made of Li-ion batteries or nickel-cadmium batteries.

An electric motor is typically powered by an electric battery (2). Lithium-ion batteries are the batteries most commonly encountered in the field of electric vehicles. The development of batteries that are increasingly powerful and of increasingly reduced size gives rise to the problem of cooling of this battery. Specifically, once the battery exceeds temperatures of the order of 50 to 60° C., there is a high risk of ignition or even of explosion of the battery. There is also a need to keep the battery at a temperature above about 20 to 25° C. so as to prevent the battery from discharging too quickly and so as to prolong its service life.

A composition of the invention may thus be used to cool the battery of an electric or hybrid vehicle and to retard and/or prevent fire propagation.

The composition according to the invention may be injected at relatively high pressure into the zones to be cooled of the propulsion system of an electric or hybrid vehicle, the shear resulting at the injector advantageously making it possible to reduce the viscosity of the fluid in the injection zone, relative to the kinematic viscosity at rest, and thus to further increase the cooling potential of the composition.

As represented schematically in FIG. 1, the propulsion system of an electric or hybrid vehicle notably comprises the electric motor part (1). Said part typically comprises power electronics (11) connected to a stator (13) and a rotor (14).

The stator comprises coils, in particular copper coils, which are powered by an alternating electric current. This makes it possible to generate a rotating magnetic field. For its part, the rotor comprises coils, permanent magnets or other magnetic materials, and is placed in rotation by the rotating magnetic field.

The power electronics (11), the stator (13) and the rotor (14) of a propulsion system (1) are parts of complex structure which generate a large quantity of heat during the running of the motor. It is thus imperative to ensure cooling of the electric motor and of the power electronics.

A rolling bearing (12) is generally incorporated between the stator (13) and the rotor (14).

A propulsion system of an electric or hybrid vehicle also comprises a transmission, and in particular a speed reducer (3) which makes it possible to reduce the rotation speed at the outlet of the electric motor and to adapt the speed transmitted to the wheels, making it possible simultaneously to control the speed of the vehicle.

Thus, the invention relates to the use of a composition as described previously for cooling the battery and the power electronics and for providing fire protection to a propulsion system of an electric or hybrid vehicle, and notably the battery.

Thus, the present invention has the advantage of allowing the use of a single composition combining coolant and flame-retardant or fire-retardant properties, as a fluid for cooling and fire-protecting a battery in an electric or hybrid vehicle, while at the same time providing a cooling function for the power electronics of an electric or hybrid vehicle.

According to a particular embodiment, besides its role as a coolant and flame retardant, the composition of the invention acts as a lubricant. This threefold role may notably be achieved when the fire retardant of formula (I) as defined previously is used in a base oil as described previously. Specifically, the hydrocarbon-based fluids with a boiling point of greater than or equal to 50° C. as described previously cannot act as lubricants.

In other words, according to this embodiment, the composition comprises:
(i) at least one base oil;
(ii) at least one fire retardant corresponding to formula (I)

$$R_F\text{-}L\text{-}R_H \qquad (I)$$

in which
$R_F$ is a perfluorinated or partially fluorinated group, in particular including from 1 to 22, preferably from 1 to 20 and even more preferentially from 1 to 16 carbon atoms,
$R_H$ is a hydrocarbon-based group, in particular including from 1 to 22, preferably from 1 to 20 and even more preferentially from 1 to 16 carbon atoms, and
L is a linker; and
(iii) at least one fluoro compound with a boiling point of between 50 and 250° C.

Still according to this particular embodiment, a composition may be used, by virtue of its combined properties in terms of lubrication, cooling and fire retarding, not only as a lubricant fluid for the motor and the transmission, and as a coolant fluid for a propulsion system of an electric or hybrid vehicle, and more particularly for the motor, the power electronics and the batteries, but also as a fluid for retarding and/or preventing fire propagation for the batteries. The invention thus also relates to the use of a composition as defined previously for lubricating, cooling and rendering safe a propulsion system of an electric or hybrid vehicle.

Still according to this embodiment, the composition in particular ensures, in an electric or hybrid vehicle, besides the cooling function and the fire-protection function for the battery, the function of lubrication and protection against wear for the members in contact and also the cooling of the motor and of the power electronics.

A propulsion system of an electric or hybrid vehicle also comprises a transmission, and in particular a speed reducer (3) which makes it possible to reduce the rotation speed at the outlet of the electric motor and to adapt the speed transmitted to the wheels, making it possible simultaneously to control the speed of the vehicle.

This reducer is subject to high friction stresses and thus needs to be appropriately lubricated in order to prevent it from being damaged too quickly.

Thus, a composition according to this particular embodiment makes it possible to lubricate the transmission, in particular the reducer, in an electric or hybrid vehicle.

Thus, the invention relates to the use of a composition as described previously for cooling the battery, the motor and the power electronics, for lubricating the motor and the transmission and for providing fire protection to a propulsion system of an electric or hybrid vehicle, and notably the battery.

In particular, such a composition makes it possible to cool the power electronics and/or the rotor and/or the stator of the electric motor. It can also ensure lubrication of the rolling bearings located between the rotor and the stator of an electric motor of an electric or hybrid vehicle.

Thus, this embodiment of the invention has the advantage of allowing the use of a single composition combining coolant and flame-retardant or fire-retardant properties, as a fluid for cooling and fire-protecting a battery in an electric or hybrid vehicle, while at the same time providing a lubricant and cooling function for the propulsion system of an electric or hybrid vehicle as a whole.

The invention also relates to a process for cooling and fire-protecting at least one battery of a propulsion system of an electric or hybrid vehicle, comprising at least one step of placing at least one battery, in particular a lithium-ion or nickel-cadmium battery, in contact with a composition as defined above.

According to a particular embodiment, the step of placing in contact consists of immersion or semi-immersion of the battery in said composition or else of injection of said composition at the surface of the battery.

All of the features and preferences described for the cooling composition according to the invention and for the uses thereof also apply to this process.

Cooling with a composition according to the invention may be performed via any method known to those skilled in the art.

The battery may be in immersion or semi-immersion, static or in circulation, in said composition.

As examples of placing in direct contact, mention may be made of cooling by injection, by jet, by spraying or by formation of a mist using the composition according to the invention under pressure and by gravity on the battery.

Advantageously the composition is injected by jet at relatively high pressure into the zones of the propulsion system to be cooled. Advantageously, the shear resulting from this injection makes it possible to reduce the viscosity of the fluid in the injection zone, relative to the kinematic viscosity at rest, and thus to further increase the cooling potential of the composition.

The invention claimed is:

1. A composition for cooling a propulsion system of an electric or hybrid vehicle, comprising:
    at least one base oil, or at least one hydrocarbon-based fluid with a boiling point of greater than or equal to 50° C.;
    at least one fire retardant represented by formula (I)

$$R_F\text{-}L\text{-}R_H \qquad (I)$$

in which,
    $R_F$ is a perfluorinated or partially fluorinated group,
    $R_H$ is a hydrocarbon-based group, and
    L is a linker; and
    at least one fluoro compound having a boiling point of between 50° C. and 250° C.

2. The composition as claimed in claim 1, wherein:
    the fluoro compound is different from the fire retardant; and
    the composition comprises the base oil or the hydrocarbon-based fluid in an amount of greater than or equal to 80% by weight, relative to the total weight of the composition.

3. The composition as claimed in claim 1, wherein the composition comprises a mass ratio of the fire retardant to the fluoro compound of between 0.2 and 200.

4. The composition as claimed in claim 1, wherein the composition comprises micelles formed by the fire retardant and containing the fluoro compound.

5. The composition as claimed in claim 1, wherein L is chosen from the following divalent groups: —CH$_2$—, —CH=CH—, —O—, —S—, or —PO$_4$—.

6. The composition as claimed in claim 1, wherein the composition comprises between 0.5% and 40% by weight of the fire retardant, relative to the total weight of the composition.

7. The composition as claimed in claim 1, wherein the boiling point of the fluoro compound is between 55° C. and 120° C.

8. The composition as claimed in claim 1, wherein the fluoro compound is a perfluorinated compound.

9. The composition as claimed in claim 1, wherein the fluoro compound is chosen from perfluorooctane, perfluorocyclohexane, or mixtures thereof.

10. The composition as claimed in claim 1, wherein the composition comprises between 0.01% and 20% by weight of the fluoro compound, relative to the total weight of the composition.

11. The composition as claimed in claim 1, wherein the base oil is chosen from synthetic oils, poly-α-olefins, and polyalkylene glycols obtained by polymerization or copolymerization of alkylene oxides comprising from 2 to 8 carbon atoms.

12. The composition as claimed in claim 1, wherein the hydrocarbon-based fluid has a boiling point of between 50° C. and 350° C.

13. The composition as claimed in claim 1, wherein the hydrocarbon-based fluid is totally saturated.

14. The composition as claimed in claim 1, wherein the hydrocarbon-based fluid comprises at least 90% by weight of isoparaffins, relative to the total weight of hydrocarbon-based fluid.

15. The composition as claimed in claim 1, wherein the hydrocarbon-based fluid is obtained via a process of catalytic hydrogenation of a deoxygenated and/or isomerized feedstock of biological origin, at a temperature ranging from 80° C. to 180° C., and at a pressure ranging from 50 bar to 160 bar.

16. The composition as claimed in claim 1, wherein the hydrocarbon-based fluid comprises from 98% to 100% by weight of isoparaffins, relative to the total weight of the hydrocarbon-based fluid, and the hydrocarbon-based fluid has a kinematic viscosity at 40° C. of less than or equal to 5 cSt.

17. The composition as claimed in claim 1, wherein the composition comprises, relative to the total weight of the composition:
    from 60% to 97.99% by weight of the base oil or the hydrocarbon-based fluid;
    from 2% to 30% by weight of fire retardant; and
    from 0.01% to 20% by weight of fluoro compound.

18. A method for promoting the contact between a fire retardant corresponding to formula (I) as defined in claim 1 and an element of a propulsion system of an electric or hybrid vehicle when thermal runaway is observed, comprising adding at least one fluoro compound having a boiling point of between 50° C. and 250° C. to a formulation comprising the fire retardant and a base oil or a hydrocarbon-based fluid having a boiling point of greater than or equal to 50° C.

19. A process for cooling and fire-protecting a battery of a propulsion system of an electric or hybrid vehicle, comprising contacting the battery with a composition as defined in claim 1.

20. The process as claimed in claim 19, wherein the contacting the battery comprises:
    completely or partially immersing the battery in a static or circulating amount of the composition; or
    injecting, jetting, misting, or spraying the composition on the battery using pressure or gravity.

* * * * *